US00RE44477E

(19) United States
(12) Reissued Patent
Emerson et al.

(10) Patent Number: US RE44,477 E
(45) Date of Reissued Patent: Sep. 3, 2013

(54) SYSTEM FOR MODIFYING AND TARGETING ADVERTISING CONTENT OF INTERNET RADIO BROADCASTS

(75) Inventors: Harry E. Emerson, Flanders, NJ (US); William A. Grywalski, Budd Lake, NJ (US); Gerald M. LeBow, Valhalla, NY (US)

(73) Assignee: Media Werbung, LLC, Newark, DE (US)

(21) Appl. No.: 12/931,733

(22) Filed: Oct. 11, 2011

Related U.S. Patent Documents

Reissue of:
(64) Patent No.: 7,490,053
Issued: Feb. 10, 2009
Appl. No.: 09/477,936
Filed: Jan. 5, 2000

U.S. Applications:
(60) Provisional application No. 60/119,443, filed on Feb. 10, 1999.

(51) Int. Cl.
*G06Q 30/00* (2012.01)

(52) U.S. Cl.
USPC ..... 705/14.61

(58) Field of Classification Search
USPC ..... 705/14
See application file for complete search history.

(56) References Cited

U.S. PATENT DOCUMENTS

| | | | | |
|---|---|---|---|---|
| 5,155,591 | A | 10/1992 | Wachob | 725/35 |
| 5,572,643 | A | 11/1996 | Judson | 709/218 |
| 5,727,156 | A | 3/1998 | Herr-Hoyman et al. | 702/219 |
| 5,737,619 | A | 4/1998 | Judson | 715/236 |
| 5,793,964 | A | 8/1998 | Rogers et al. | 709/202 |
| 5,793,972 | A | 8/1998 | Shane | 709/219 |

(Continued)

FOREIGN PATENT DOCUMENTS

| | | |
|---|---|---|
| EP | 0 424 648 A2 | 5/1991 |
| EP | 0 751 640 A2 | 1/1997 |

(Continued)

OTHER PUBLICATIONS

"Microsoft Press Computer Dictionary, Third Edition", Microsoft Press, 1997, p. 384.

(Continued)

*Primary Examiner* — Arthur Duran
(74) *Attorney, Agent, or Firm* — Ernest D. Buff; Ernest D. Buff & Assoc. LLC

(57) ABSTRACT

A radio station transmits its broadcast audio content, including audible advertisements, to listeners over the Internet via an Internet Hosting Service that provides listener access to radio station content. A computing system at the radio station digitizes the audio, and supplies marking information that identifies the beginning and duration of commercials. The digital marking information is supplied with the radio station's audio to the Internet Hosting Service. The Internet Hosting Service maintains a repository of replacement audio commercials along with information about the commercials including duration. Upon receiving the digital marker indicating the presence of a commercial, the Internet Hosting Service selects a replacement commercial of comparable duration from its repository. The Internet Hosting Service then substitutes the replacement commercial for the original broadcast commercial and produces an edited audio program for delivery to the listeners that carries advertising of higher value than the original advertising.

16 Claims, 3 Drawing Sheets

(56) References Cited

U.S. PATENT DOCUMENTS

| | | | | | |
|---|---|---|---|---|---|
| 5,794,210 | A | | 8/1998 | Goldhaber et al. | 705/14.69 |
| 5,802,299 | A | | 9/1998 | Logan et al. | 709/218 |
| 5,805,815 | A | | 9/1998 | Hill | 709/218 |
| 5,809,242 | A | | 9/1998 | Shaw et al. | 709/217 |
| 5,854,897 | A | | 12/1998 | Radziewicz et al. | 709/224 |
| 5,870,546 | A | | 2/1999 | Kirsch | 709/205 |
| 5,917,830 | A | * | 6/1999 | Chen et al. | 370/487 |
| 5,933,811 | A | * | 8/1999 | Angles et al. | 705/14 |
| 6,009,409 | A | * | 12/1999 | Adler et al. | 705/14 |
| 6,061,659 | A | * | 5/2000 | Murray | 705/14 |
| 6,094,677 | A | * | 7/2000 | Capek et al. | 709/219 |
| 6,112,192 | A | | 8/2000 | Capek | 705/59 |
| 6,133,912 | A | * | 10/2000 | Montero | 345/716 |
| 6,298,218 | B1 | * | 10/2001 | Lowe et al. | 455/66 |
| 6,577,716 | B1 | | 6/2003 | Minter et al. | 379/101.01 |
| 6,587,127 | B1 | * | 7/2003 | Leeke et al. | 715/765 |
| 2002/0099600 | A1 | * | 7/2002 | Merriman et al. | 705/14 |
| 2002/0188748 | A1 | * | 12/2002 | Blackwell et al. | 709/232 |
| 2011/0313864 | A1 | * | 12/2011 | Eldering et al. | 705/14.66 |

FOREIGN PATENT DOCUMENTS

| | | | | |
|---|---|---|---|---|
| EP | 0 847 156 | A2 | | 6/1998 |
| WO | WO 97/49241 | | | 12/1997 |
| WO | WO 01/24421 | | * | 5/2001 |

OTHER PUBLICATIONS

"Microsoft Press Computer Dictionary, Third Edition", Microsoft Press, 1997, p. 348.*

* cited by examiner

SYSTEM FOR MODIFYING AND TARGETING ADVERTISING CONTENT OF INTERNET RADIO BROADCASTS

Matter enclosed in heavy brackets [ ] appears in the original patent but forms no part of this reissue specification; matter printed in italics indicates the additions made by reissue.

CROSS REFERENCE TO RELATED APPLICATIONS

This application claims the benefit of U.S. Provisional Patent Application No. 60/119,443, filed Feb. 10, 1999 entitled "System For Modifying And Targeting Advertising Content of Internet Radio Broadcasts".

BACKGROUND OF THE INVENTION

1. Field of the Invention

The present invention relates to a method for substituting replacement commercial advertisements in place of original broadcast commercials for radio programs broadcast via the Internet.

2. Description of the Prior Art

Advertising is the primary mechanism by which producers of products and services capture the attention of potential consumers. In today's global marketplace of chaos and dislocation, the need for advertising has never been greater. Traditionally, mass advertising occurs by way of mass distribution through television, radio, newspapers and the like. Usually, advertisers prescribe the media content and pay for the mass distribution thereof. In some instances, the consumer subsumes a portion of the costs of the advertisements, as for example, by paying for a newspaper subscription. The advent of computer-driven technology, and especially the Internet, has rendered traditional advertising methods obsolete.

The Internet is a system of linked computers that provides for global information exchange and includes innumerable sites, each of which presents advertising, research and other information about a particular organization. Many organizations now rely on the Internet to obtain and transmit crucial and, oftentimes, sensitive information. Thus, the Internet has quickly become one of the most effective means by which an organization can globally advertise its goods and services.

It is now possible to listen to radio programs with a personal computer or other device capable of receiving audio data via the Internet. This is because it is becoming common for a regular broadcast radio station to make their programs available via the Internet. Internet radio programs originate from many different regions of the world. As a result, they are frequently sprinkled with commercial advertisements that are targeted to the region from which the program originated. A commercial for an automobile dealer in Lisbon is of little value to an Internet listener in Philadelphia. On the other hand, an Internet Hosting Service providing radio station content to the listener would benefit by substituting commercials of advertisers interested in reaching such listeners. The original commercials provide no benefit to the original radio station or advertisers, nor to the listener, nor are they a source of revenue for a business organization such as an Internet Hosting Service which presents radio stations on the Internet.

There remains a need in the art for an effective way to substitute replacement commercials for original broadcast commercials in radio programs transmitted via the Internet.

SUMMARY OF THE INVENTION

In accordance with the present invention, there is provided a method for substituting replacement commercial advertisements in place of original broadcast commercials for radio programs broadcast via the Internet. Generally stated, the method enables (a) generating a plurality of replacement radio commercials of various predetermined time lengths, whereby each replacement radio commercial has an associated time length; (b) digitizing the replacement radio commercials and the associated time lengths; (c) storing in an array the digitized replacement radio commercials and the associated time lengths, the array being stored by an Internet Hosting Service; (d) marking each of the broadcast radio commercials with a digital marker by the radio station, the digital marker indicating the start and duration time of the broadcast radio commercial within the Internet radio program; (e) transmitting the marked Internet radio program to the Internet Hosting Service; (f) receiving of the marked Internet radio program by the Internet Hosting Service; (g) detecting a digital marker of a commercial on the received Internet radio program; (h) reading the duration time of the received commercial from the detected digital marker; (i) comparing the read duration time with the associated time lengths stored in the array; (j) selecting from the array a digitized replacement radio commercial having an associated time length equal to the read duration time; (k) substituting the selected digitized replacement radio commercial in place of the broadcast commercial; and (l) repeating steps (g) through (k) until the end of the Internet radio program, whereby the listener of the Internet radio program receives an edited program having one or more replacement radio commercials substituted in place of the broadcast radio commercials.

Further, the invention provides a system for substituting broadcast commercials of an Internet radio program, with replacement commercials, comprising: (a) radio station means for marking the broadcast commercials of the Internet radio program with a mark, the mark indicating the start and time duration of the broadcast commercial; (b) input computer server means of an Internet Hosting Service for receiving the marked Internet radio program; (c) commercial storage means for storing a plurality of digitized replacement audio commercials; (d) central processor means for selecting one of the digitized replacement audio commercials from the commercial storage means; (e) marker decoder means for decoding the mark, the mark being supplied to the central processor; (f) digital audio processor means for generating an edited radio program by substituting the selected digitized replacement audio commercial in place of the broadcast commercial; and (g) output computer server means for transmitting the edited radio program to a user.

Optionally, the invention provides a system wherein the commercial storage means further stores commercial type and a user profile storage means stores individual user ID and user demographics, whereby the central processor employs the user ID to match the user demographics to the commercial type for selecting a commercial targeted to the user.

Also optionally, as the audio content emanating from the radio station is digitized, it is placed into data packets each bearing a sequential serial number. The digitizing mark that is created to identify the presence of a commercial is embedded with the serial numbers of the audio packets constituting the beginning and the duration of the commercial. The Internet Hosting Service, upon receiving the audio stream from the radio station in serialized packet format, along with the marking information stream containing the serial numbers of the packets containing audio commercials, can precisely remove the audio broadcast commercial and substitute it with a replacement commercial with no audible artifacts suggesting to the listener that such replacement has taken place.

Conveniently, a large percentage of radio stations utilize a computer system rather than tapes or CD's for the origination of the majority of their audio content, including music and commercials. Such systems, referred to generally as "broadcast automation systems" or "live assist systems" actually play the audio for the music or the commercial. A broadcast automation system maintains a listing of all audio events that the station plans to broadcast, including critical information of each event such as event type and duration. It can signal the precise beginning and ending of each event, and can transmit the identifying data associated with each event to an external system such as an Internet Hosting Service. Broadcast automation systems, having the capabilities listed above, facilitate the implementation of advertising replacements as described herein.

Advantageously, the method of the present invention permits an Internet Hosting Service to substitute local advertisements in place of originally broadcast advertisements in radio programs broadcast via the Internet. The invention enables the Internet Hosting Service to generate additional revenues and to target advertisements to its customers. Customers are provided with increased opportunity to receive information concerning services or products more attuned to their needs.

BRIEF DESCRIPTION OF THE DRAWINGS

The invention will be more fully understood and further advantages will become apparent when reference is made to the following detailed description and the accompanying drawings, in which.

DESCRIPTION OF THE PREFERRED EMBODIMENTS

In accordance with the present invention, there is provided a method for substituting replacement commercial advertisements in place of original broadcast commercials for radio programs broadcast via the Internet. Internet radio programs originate from many different regions of the world. As a result, they are frequently sprinkled with commercial advertisements that are targeted to the region from which the program originated. A commercial for an automobile dealer in Lisbon is of little value to an Internet listener in Philadelphia. On the other hand, an Internet Hosting Service providing Internet radio station access to the listener would benefit by substituting commercials of advertisers interested in reaching such listeners.

The invention provides a method for substituting replacement radio commercials in place of broadcast radio commercials by an Internet Hosting Service. In practice, each commercial is marked by the radio station with a digital marker that indicates the start and length of each commercial in the program broadcast. When the program is received by the Internet Hosting Service, each commercial is identified by its marker and a replacement commercial of the appropriate length is selected from a list of commercials kept by the Internet Hosting Service and substituted in place of the original commercial. The Internet Hosting Service may be any type of service which has the ability to receive communications from a radio station. That is to say, the Internet Hosting Service may be a private communications entity, a broadcasting network data center, a service provider or the like. In one embodiment, the Internet Hosting Service may comprise the same entity as an Internet service provider.

Figure 1:
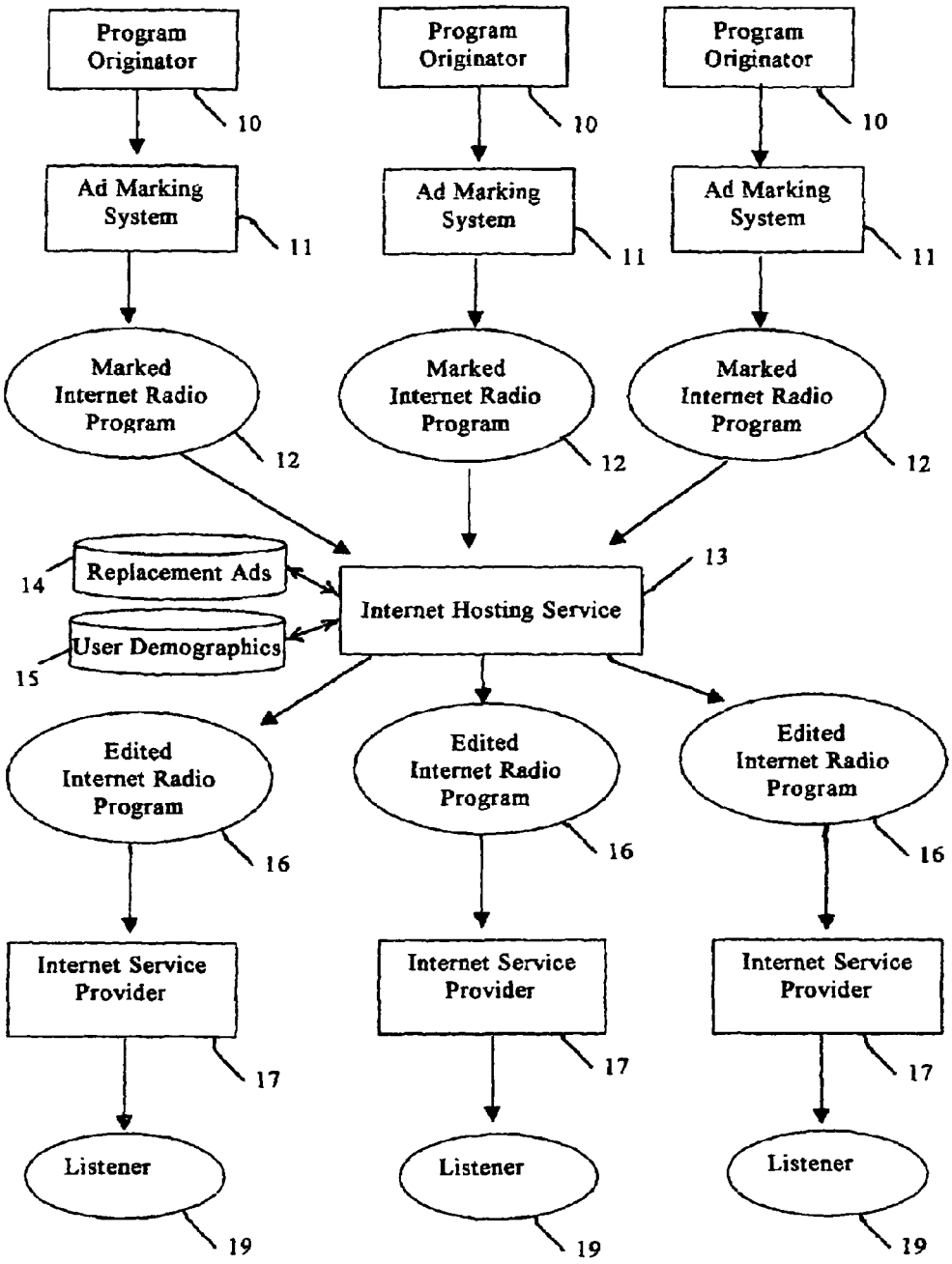
FIG. 1 is a block diagram representing the modification of advertisements during the flow of an Internet radio program from the program originator to the listener.
Figure 2:
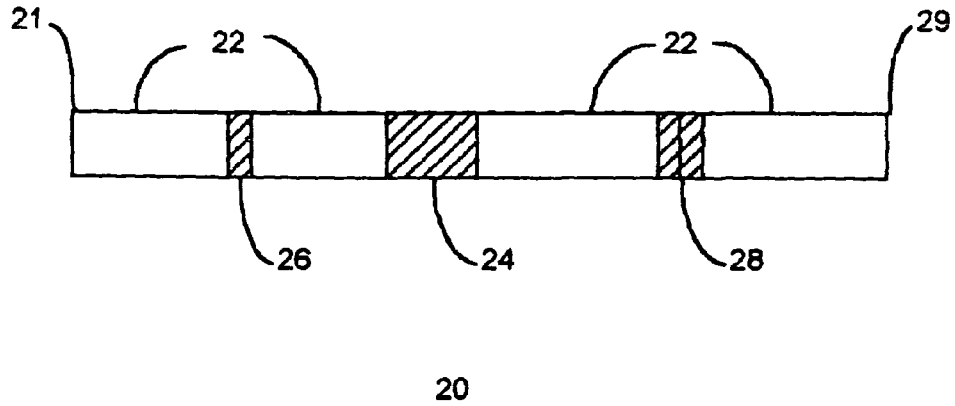
FIG. 2 schematically depicts a radio program segment containing commercials and marker.
Figure 2:
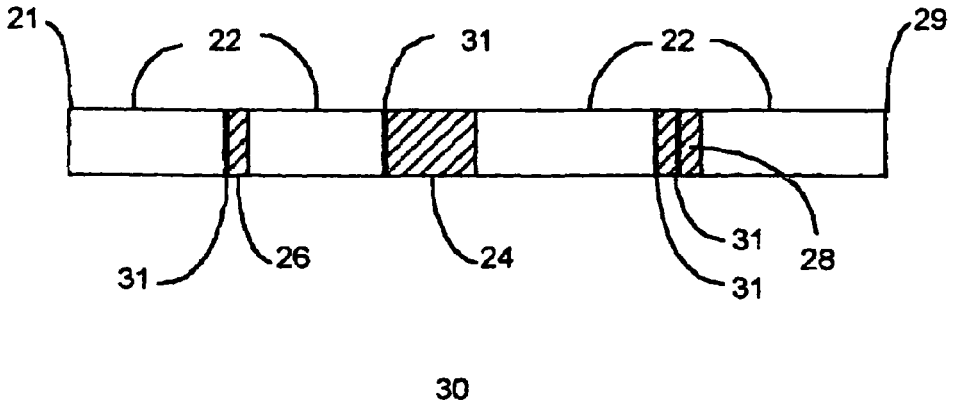

As illustrated by FIGS. 1 and 2 of the drawings, marked Internet radio programs 12 from a plurality of program originators 10 are sent to hosting service 13 via the Internet. The arrows in FIG. 1 indicate transfers, including Internet transfers. These Internet radio programs have broadcast radio commercials as part of their content. Ad marking systems 11, which may be broadcast automation systems of the radio stations, introduce digital markings to accompany the audio content indicating the beginning and duration of audio ads in the audio stream. Further, ad marking systems 11 may digitize the radio station audio content into packets bearing sequential serial numbers, and the digital markings which indicate the beginning and end of audio ads may relate such beginnings and endings to audio packet serial numbers. Hosting service 13 receives the marked audio stream wherein the audio may be music interleaved with commercials, and the markings may be digital data packets indicating the beginning and ending of commercials within that audio stream. Hosting service 13 maintains a database of replacement audio ads 14 encompassing the ads and associated data describing each ad such as duration and the desired user demographics that the advertiser would like to reach. Hosting service 13 replaces audio ads emanating from the radio station program originator 10 with replacement ads of equivalent duration drawn from replacement ad database 14, in the process creating an edited Internet radio program 16. The resolution of the Ad Marking System 11 in digitizing the audio stream into serialized packets enables the creation of edited Internet radio programs 16 which are absent of audible artifacts to indicate that ad substitution has taken place. Edited Internet radio programs 16 are delivered to listeners 19 via the Internet Service Providers 17 which provide Internet access to the listeners 19. Listeners 19 listen to the Internet radio stations from program originators 10, hearing different ads from those who might contemporaneously listen to the radio station's over-the-air broadcast with a conventional radio. Optionally, the hosting service 13 may examine the desired user demographics associated with replacement ads 14 and match them against the user demographic database 15 comprised of demographic information about listeners 19. If listeners 19 have differing demographics, the edited Internet radio programs 16 may be unique for each demographic type of listener 19 who may be listening to the same Internet radio station. That is, males listening to Internet radio station WXYZ may receive a different edited Internet radio program 16 from females listening to the same station.

The method for substituting replacement radio commercials in place of a plurality of broadcast radio commercials on an Internet radio program transmitted by a hosting service 13 to a listener 19 via an Internet service provider 17 comprises the steps of: (a) generating a plurality of replacement radio commercials of various predetermined time lengths, whereby each replacement radio commercial has an associated time length; (b) digitizing the replacement radio commercials and the associated time lengths; (c) storing in an array the digitized replacement radio commercials and the associated time lengths, the array being stored by the Internet Hosting Service 13; (d) marking each of the broadcast radio commercials with a digital marker by the ad marking system 11, the digital marker indicating the start and duration time of the broadcast radio commercial within the Internet radio program 12; (e) transmitting the marked Internet radio program 12 to the Internet Hosting Service 13; (f) receiving the marked Internet radio program 12 by the Internet Hosting Service 13; (g) examining the marked Internet radio program 12 by the Internet Hosting Service 13; (h) detecting a digital marker of a commercial on the marked Internet radio program 12; (i) reading the duration time of the commercial from the detected digital marker; (j) comparing the read duration time with the associated time lengths stored in the array; (k) selecting from the array a digitized replacement radio commercial having an associated time length equal to the read duration time; (l) substituting the selected digitized replacement radio commercial in place of the commercial; and (m) repeating steps (h) through (l) until the end of the Internet radio program.

A segment of Internet radio program 20 starts at 21 and ends at 29. Segment 20 is comprised of program elements 22 and commercials 24, 26, 28 of differing time durations. The hosting service 13 or the program originator 10 is provided with a means for marking the beginning of each commercial with marker 31. Marker 31 comprises a start indicator and a time duration of commercials 24, 26 and 28. The marking means can take any number of methods known in the art, such as putting a digital pulse-modulated inaudible tone on a subcarrier of the audio wave. Alternatively, marking the start and time duration of the commercial is accomplished by adding a digital marker information packet to the audio data stream.

Figure 3:
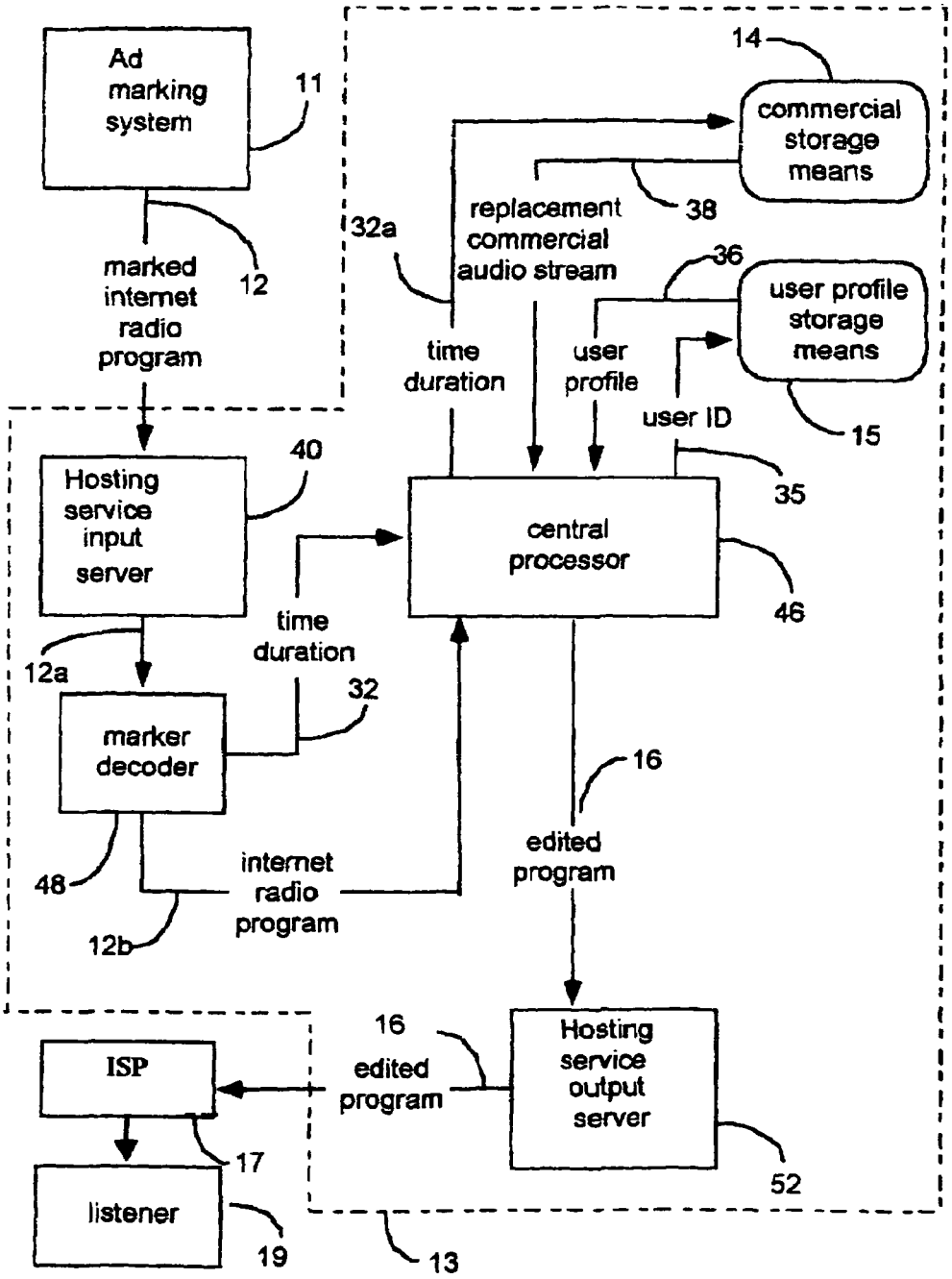
FIG. 3 is a block diagram of a system for substituting local radio commercials in place of broadcast Internet radio commercials.

FIG. 3 illustrates the system used by Internet Hosting Service 13 for reading marked Internet radio program 12 received from program originator 10. Internet Hosting Service 13 maintains commercial storage means 14. Commercial storage means 14 comprises a database of digitized radio commercials of various predetermined time lengths along with each commercial's time length. Commercial storage means 14 is used to supply an appropriate duration commercial on demand. Preferably, Internet Hosting Service 13 also maintains user profile array 15. This array comprises user ID and demographic information, whereby the demographic information may be used to target specific commercials to specific users.

Advantageously, the method of the present invention permits an Internet Hosting Service to substitute replacement advertisements in place of originally broadcast advertisements in radio programs broadcast via the Internet. The invention enables the Internet Hosting Service to generate additional revenues and to target advertisements to its customers.

In practice, radio station program originator 10 sends broadcast audio to ad marking system 11, and then transmits marked Internet radio program 12 via the Internet to Internet Hosting Service input server 40 of Internet Hosting Service 13. Marked Internet radio program is sent as data stream 12a to marker decoder 48. Marker decoder 48 reads marker 31 and decodes time duration 32. Internet radio program data stream 12b and time duration 32 are passed to central processor 46. Central processor 46 uses time duration 32 to find an equal length substitute commercial from commercial storage means 14. The selected commercial is returned to central processor 46 as replacement commercial audio stream 38. Central processor 46 substitutes replacement commercial audio stream 38 for the original commercial resulting in edited program 16. Edited program 16 is passed to Internet Hosting Service output server 52 and then sent via Internet through the Internet Service Provider 17 to the user, listener 19.

Optionally, the system further comprises user profile storage means 15, where demographics of each user are stored along with the user's ID number. User ID 35, obtained from output server 52, is also passed to central processor 46 and to user profile storage means 15. In this manner, the system is provided with means for selecting a commercial targeted for a specific user or type of user.

The invention provides a system for substituting broadcast commercials of an Internet radio program, with replacement commercials, comprising: (a) radio station means for marking the broadcast commercials of the Internet radio program with a mark, the mark indicating the start and time duration of the broadcast commercial; (b) input server means for receiving the marked Internet radio program; (c) commercial storage means for storing a plurality of digitized radio commercials; (d) central processor means for selecting one of the digitized radio commercials from the commercial storage means; (e) marker decoder means for decoding the mark, the mark being supplied to the central processor; (f) central processor mixing means for generating an edited radio program by substituting the selected digitized radio commercial in place of the broadcast commercial; and (g) output server for transmitting the edited radio program to a user.

Optionally, the invention provides a system wherein the commercial storage means further stores commercial type and a user profile storage means stores individual user ID and user demographics, whereby the central processor employs the user ID to match the user demographics to the commercial type for selecting a commercial targeted for a specific user or type of user.

Having thus described the invention in rather full detail, it will be understood that such detail need not be strictly adhered to but that various changes and modifications may suggest themselves to one skilled in the art, all falling within the scope of the present invention as defined by subjoined claims.

What is claimed is:

1. An interactive method for substituting replacement radio commercials in place of a plurality of broadcast radio commercial streams on an Internet radio program broadcast by a radio station to an Internet hosting service based on user preferences indicating demographic, and personal preferences, comprising the steps of:

(a) generating a plurality of replacement radio commercial streams of various predetermined time lengths, whereby each replacement radio commercial has an associated time length;

(b) digitizing said replacement radio commercial streams and said associated time lengths;

(c) storing in an array said digitized replacement radio commercial streams and said associated time lengths, said array stored at an Internet service provider;

(d) maintaining user demographic information and user preferences;

(e) marking each of said broadcast radio commercial streams with a digital marker by said radio station, said digital marker indicating the start and duration time of said broadcast radio commercial within said Internet radio program;

(f) transmitting said marked Internet radio program stream to said Internet hosting service;

(g) receiving of said marked Internet radio program stream by said Internet hosting service;

(h) examining of said marked Internet radio program stream by said Internet hosting service;

(i) detecting a digital marker of a commercial on said received Internet broadcast program stream;

(j) reading the duration time, of said commercial, from said detected digital marker;

(k) comparing *with a processor* said read duration time with said associated time lengths stored in said array;

(l) selecting from said array a digitized replacement radio commercial having an associated time length equal to said read duration time to match said demographic information and said user preferences with said replacement commercial stream having an associated time length equal to said real duration time;

(m) substituting said selected digitized replacement radio commercial stream in place of said broadcast commercial stream; and (n) repeating steps (h) through (l) until the end of said Internet radio program, whereby the listener of said Internet radio program stream receives an edited program stream having one or more replacement radio commercial streams substituted in place of said broadcast radio commercial.

2. A method as recited in claim 1 wherein said marking of broadcast radio commercial streams is performed by a radio station computer system, such as a broadcast automation system.

3. A method as recited in claim 2 wherein the audio stream of the radio station is digitized into packets bearing sequential serial numbers, and said marking of broadcast commercial streams by marking the start time and duration of the commercial identifies the audio packet serial numbers constituting the beginning and duration of the audio commercial to be replaced.

4. A method as recited in claim 1 wherein the Internet hosting service maintains commercial type information for targeting ads to consumers, and user demographic information, and matches said user demographics and personal preferences to said commercial type for selecting a commercial targeted to said user.

5. An interactive system for substituting broadcast commercial streams of an Internet radio program stream, with replacement commercial streams, comprising:

(a) radio station means for marking said broadcast commercial streams of said Internet radio program with a mark, said mark indicating the start and time duration of said broadcast commercial stream;

(b) input server means for receiving said marked Internet radio program stream by an Internet hosting service;

(c) commercial storage means of said Internet hosting service for storing a plurality of digitized radio commercial streams and user preferences;

(d) central processor means for selecting one of said digitized radio commercials from said commercial storage means matching said user preferences;

(e) marker decoder means for decoding said mark, said mark being supplied to said central processor;

(f) comparison means to select a digitalized radio commercial stream in place of said broadcast commercial stream;

(g) central processor mixing means for generating an edited radio program stream by substituting said selected digitized radio commercial streams in place of said broadcast commercial stream; and (h) output server means for transmitting said edited radio program stream to a user.

6. A system as recited by claim 5 wherein said commercial storage means further stores commercial type.

7. A system as recited by claim 5 further comprising user profile storage means for storing individual user ID and user demographics, whereby said central processor employs said user ID to match said user demographics and said user preferences to said commercial type for selecting a commercial targeted to said user.

*8. A method for providing individually targeted radio commercials to a user listening to a radio program over the Internet comprising:*

*(a) receiving in digitized form, using at least one processor, a plurality of replacement radio commercials of various time lengths;*

*(b) storing said replacement radio commercials and their respective associated time lengths in machine-readable storage associated with said at least one processor;*

*(c) obtaining, using said at least one processor, demographic information and preferences of the user;*

*(d) receiving in digitized form, using said at least one processor, a radio program stream from a radio station, said radio program stream having digital markers therein indicating the start and duration times of original radio commercials within said radio program stream;*

*(e) examining, using said at least one processor, said marked radio program stream;*

*(f) detecting, using said at least one processor, at least one of said digital markers in said radio program stream;*

*(g) reading, using said at least one processor, the duration time of said original radio commercial from said at least one detected digital marker;*

*(h) comparing, using said at least one processor, said read duration time with said stored associated time lengths;*

*(i) selecting, using said at least one processor, from said machine-readable storage, one of said digitized replacement radio commercials having the appropriate time length and characteristics targeted to said user demographics and preferences;*

*(j) substituting, using said at least one processor, said selected digitized replacement radio commercial in place of said original radio commercial in said radio program stream; and*

*(k) sending, using said at least one processor, said radio program stream containing said replacement radio commercials to the user, whereby each such user receives a radio program stream targeted to such user's individual demographics and preferences, said method being capable of sending to other users, having different demographics and preferences, radio program streams that differ in content from the radio program stream sent to said user.*

*9. A system for providing individually targeted radio commercials to a user listening to a radio program over the Internet, whereby each such user receives a radio program stream targeted to such user's individual demographics and preferences, said system being capable of sending to other users, having different demographics and preferences, radio program streams that differ in content from the radio program stream sent to said user, comprising:*

*(a) at least one processor having at least one machine-readable storage device;*

*(b) program instructions stored in said at least one machine-readable storage device, said program instructions being adapted to cause said at least one processor to function as means for, respectively;*

*(i) receiving in digitized form a plurality of replacement radio commercials of various time lengths;*

*(ii) storing said replacement radio commercials and their respective associated time lengths in said at least one machine-readable storage device;*

(iii) *obtaining demographic information and preferences of the user;*

(iv) *receiving, in digitized form, said radio program stream from a radio station, said radio program stream having digital markers therein indicating the start and duration times of original radio commercials within said radio program stream;*

(v) *examining said marked radio program stream;*

(vi) *detecting at least one of said digital markers in said radio program stream;*

(vii) *reading the duration time of said original radio commercial from said at least one detected digital marker;*

(viii) *comparing said read duration time with said stored associated time lengths;*

(ix) *selecting from said at least one machine-readable storage device one of said digitized replacement radio commercials having the appropriate time length and characteristics targeted to said user demographics and preferences;*

(x) *substituting said selected digitized replacement radio commercial in place of said original radio commercial in said radio program stream; and*

(xi) *sending said radio program stream containing said replacement radio commercials to the user.*

*10. The system of claim 9, further comprising a radio station processor, located in a radio station, said radio station processor adapted to insert in a digitized program stream digital markers indicating the start and duration times of original radio commercials therein, and to transmit said marked digitized radio program stream to said at least one processor of an Internet service provider that makes available said system of claim 9.*

*11. The system of claim 9, further comprising a user processor of the user, said user processor adapted to provide the user's demographics and preferences to one or more systems on the Internet and to request, on the user's demand, transmission from said system in accordance with claim 9 of a digitized radio program stream targeted to the demographics and preferences of the user.*

*12. The system of claim 10, wherein said radio station processor comprises a broadcast automation system.*

*13. The system of claim 10, wherein said radio station processor is adapted to associate ordered identifiers with packets comprising said digitized radio program stream, said identifiers corresponding to the beginning and ending packets of said original radio commercials.*

*14. The method of claim 8, further comprising maintaining, using said at least one processor, commercial type information for said stored replacement radio commercials, and wherein said selecting step is performed by selecting a radio commercial of a commercial type based on the user's demographics and preferences.*

*15. The method of claim 14, further comprising storing, using said at least one processor, user individual user ID and user demographics, whereby said at least one processor employs said user ID to match said user demographics and said user preferences to said commercial type for selecting a commercial targeted to said user.*

*16. A method for a radio programming originator to provide individually targeted radio commercials to a user listening to the originator's radio program over the Internet, comprising:*

(a) *creating, using a radio station processor, a digitized radio program stream;*

(b) *marking, using the radio station processor, the radio program stream with digital markers indicating the start and duration time of original radio commercials within the radio program stream;*

(c) *engaging a service provider to deliver the radio stream to Internet users with individually targeted radio commercials therein, and transmitting, using the radio station processor, the marked radio program stream to the service provider, wherein said service provider undertakes to practice a distribution method comprising:*

(i) *receiving in digitized form a plurality of replacement radio commercials of various time lengths;*

(ii) *storing said replacement radio commercials and their respective associated time lengths in machine-readable storage;*

(iii) *obtaining demographic information and preferences of the user;*

(iv) *receiving the originator's digitized radio program stream with said digital markers therein indicating the start and duration times of original radio commercials within the originator's radio program stream;*

(v) *examining said marked radio program stream;*

(vi) *detecting at least one of said digital markers in said radio program stream;*

(vii) *reading the duration time of said original radio commercial from said at least one detected digital marker;*

(viii) *comparing said read duration time with said stored associated time lengths;*

(ix) *selecting from said machine-readable storage, one of said digitized replacement radio commercials having the appropriate time length and characteristics targeted to said user demographics and preferences;*

(x) *substituting said selected digitized replacement radio commercial in place of said original radio commercial in said radio program stream; and*

(xi) *sending said radio program stream containing said replacement radio commercials to the user, whereby each such user receives a radio program stream targeted to such user's individual demographics and preferences, said method being capable of sending to other users, having different demographics and preferences, radio program streams that differ in content from the radio program stream sent to said user.*

* * * * *